United States Patent [19]
Hartung et al.

[11] Patent Number: 5,612,747
[45] Date of Patent: Mar. 18, 1997

[54] METHOD AND APPARATUS FOR VECTOR QUANTIZATION CACHING IN A REAL TIME VIDEO CODER

[75] Inventors: John Hartung, Warren; Jonathan D. Rosenberg, North Plainfield, both of N.J.

[73] Assignee: Lucent Technologies Inc., Murray Hill, N.J.

[21] Appl. No.: 400,704

[22] Filed: Mar. 8, 1995

[51] Int. Cl.$^6$ .................................................. H04N 7/12
[52] U.S. Cl. .......................................... 348/422; 348/418
[58] Field of Search .................................. 348/414, 417, 348/418, 422; 375/240, 245; 382/234, 253

[56] References Cited

U.S. PATENT DOCUMENTS

| | | | |
|---|---|---|---|
| 5,068,723 | 11/1991 | Dixit et al. | 348/422 |
| 5,086,439 | 2/1992 | Asai et al. | 348/417 |

*Primary Examiner*—Amelia Au

[57] ABSTRACT

A method and apparatus for performing vector quantization in a video coder. The method includes obtaining a video frame and segmenting it into coding blocks of predetermined size. A predetermined number of the coding blocks is transferred to a first cache memory. A predetermined portion of a codebook is transferred into a first section of a second cache memory which is capable of being rotated or having addresses associated with bytes in the second cache memory interchanged or offset by a specified amount. Concurrently with computing the vector quantization for the first portion of the codebook with respect to the coding blocks in the first cache memory, a second section of the codebook is transferred into a second section of the second cache memory. The number of coding blocks transferred to the first cache memory is selected so that transferral of the second section of the codebook is completed at the same time as or prior to completion of the computation of the vector quantization. The second cache memory may be rotated so that the process may be repeated for the remaining sections of the codebook with minimal or no delay, thereby permitting vector quantization to be performed in real time video coders.

29 Claims, 4 Drawing Sheets

METHOD AND APPARATUS FOR VECTOR QUANTIZATION CACHING IN A REAL TIME VIDEO CODER

CROSS-REFERENCE TO RELATED APPLICATIONS

This application is related to U.S. patent application Ser. No. 08/399,084, Attorney Docket No. Rosenberg 2, entitled "Apparatus and Methods for Determining an Initial Huffman Coding Rate"; U.S. patent application Ser. No. 08/400,706, Attorney Docket No. Rosenberg 3, entitled "Apparatus and Methods for Selectively Reducing a Huffman Coding Rate"; and U.S. patent application Ser. No. 08/400,707, Attorney Docket No. Rosenberg 4, entitled "Apparatus and Methods for Performing Huffman Coding", which are all commonly assigned to the assignee of the present invention, and which are filed concurrently herewith. The disclosures of these related Applications are incorporated herein by reference in their entirety.

FIELD OF THE INVENTION

The present invention relates generally to video compression techniques, and, in particular, to a real time implementation of vector quantization for use in video coders using very low bit rates.

BACKGROUND OF THE INVENTION

There exist a wide variety of potential applications for video at rates below 64 kilobits per second (kb/s), including videophones, multimedia e-mail, remote sensing and interactive multimedia databases, to name a few. To implement such applications, for example, over the Public Switched Telephone Network (PSTN), requires that bitrates be reduced to approximately 30 kb/s. The requirement of a very low bit rate, however, necessitates the use of compression algorithms which allow a significant amount of information to be transmitted over channels with low bandwidth.

Video compression algorithms typically compress data by relying on redundancy that is inherently present in video sequences. Such redundancy may occur both spatially and temporally. One technique of taking advantage of both the spatial and temporal redundancy is to use vector quantization. In vector quantization, a codebook of codewords is maintained, such that the codewords are representative of coding blocks in the video sequence. Representing a block of picture elements or pels in a frame by an address in the codebook requires fewer bits than actually representing the individual pels. Compression is, thereby, achieved.

Video compression algorithms using vector quantization, however, have not found much use in real time video platforms because of their complexity. Every coding block must typically be searched into the entire codebook, thereby requiring a large amount of computation time which may contribute to delays. In addition, the codebooks often require a great deal of memory. In systems where memory size is limited, allocation of memory space presents a further problem. It is desirable, therefore, to improve the implementation of vector quantization in systems where memory size is limited so that the video coder may be used in real-time applications.

SUMMARY OF THE INVENTION

The present invention discloses a method and apparatus for performing vector quantization in video coders. The method preferably includes the steps of obtaining a video frame and segmenting it into multiple coding blocks. In one embodiment, a predetermined portion of a vector quantization codebook is transferred into a first section of a memory unit. A vector quantization process, preferably using a predictable search algorithm, is performed for a predetermined number of the coding blocks with respect to the transferred portion of the codebook. Preferably, after initiating performance of the vector quantization process, a next predetermined portion of the codebook may be transferred into a second section of the memory unit. The time required to transfer the next predetermined portion of the codebook to the memory unit is preferably less than or equal to the time required to perform the vector quantization process. The memory unit may then be rotated such that addresses previously associated with the second section of the codebook are associated with the first section of the codebook.

The steps of performing the vector quantization process, transferring a next predetermined portion of the codebook, and rotating the memory unit may be repeated until the entire codebook has been searched with respect to the predetermined number of coding blocks. Finally, the entire process may be repeated with respect to any remaining coding blocks in the video frame. The method is particularly advantageous in real time video coders having relatively small memories.

Other features and advantages of the present invention will be readily apparent by reference to the following detailed description and accompanying drawings.

DETAILED DESCRIPTION

Figure 1:
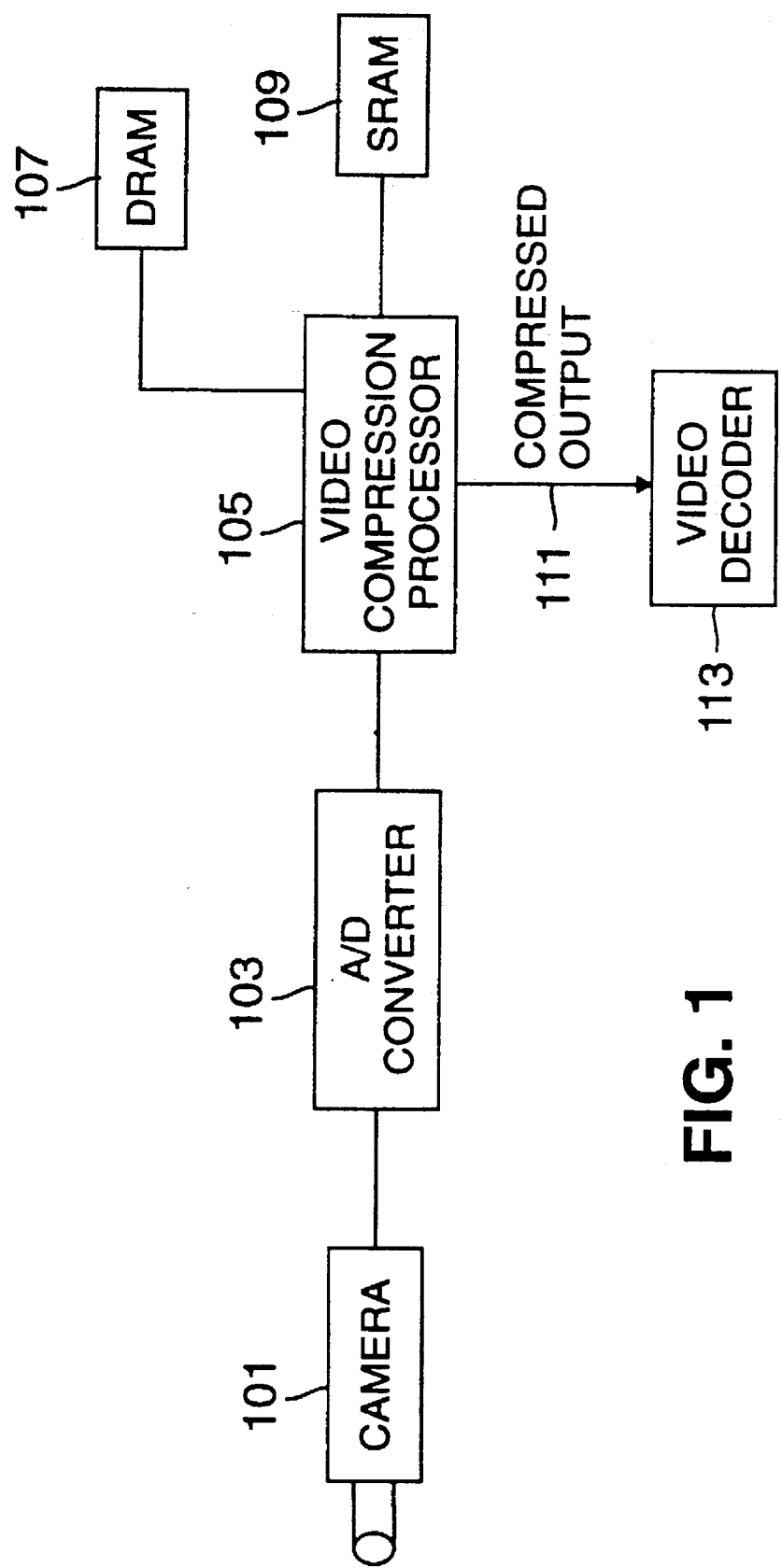
FIG. 1 shows an exemplary system in which the present invention may suitably be used.

FIG. 1 shows an exemplary system in which the present invention is particularly advantageous. A video camera 101 may suitably be connected to an analog-to-digital (A/D) converter 103 to convert video images to a digital output. The output of the A/D converter 103 may be connected to a video compression processor 105. The video compression processor 105 typically has associated with it dynamic random-access memory (DRAM) 107 as well as static random-access memory (SRAM) 109. Compressed video data may be transmitted over a data line 111 to a video decoder 113, for example, or stored for subsequent use.

The video compression processor 105 may perform various functions on the digitized video data, including motion estimation and vector quantization. For example, the video compression processor 105 may suitably implement the coder described in U.S. application Ser. No. 08/248,982, filed on May 25, 1994, entitled "Adaptive Video Coder With Dynamic Bit Allocation," and incorporated by reference herein. The coder described in U.S. application Ser. No. 08/248,982 is based upon the Motion Compensated Discrete Cosine Transform and operates on blocks of 8×8 pixels. Among other features, the coder described in the U.S. application Ser. No. 08/248,982 uses a fixed number of bits for each frame. These bits are allocated between bits used for motion estimation information, vector quantization and scalar quantization. The vector quantization is sixty-four dimensional, in other words, an entire 8×8 block. Both the encoder and decoder maintain two 256-entry codebooks of vectors.

Figure 2:
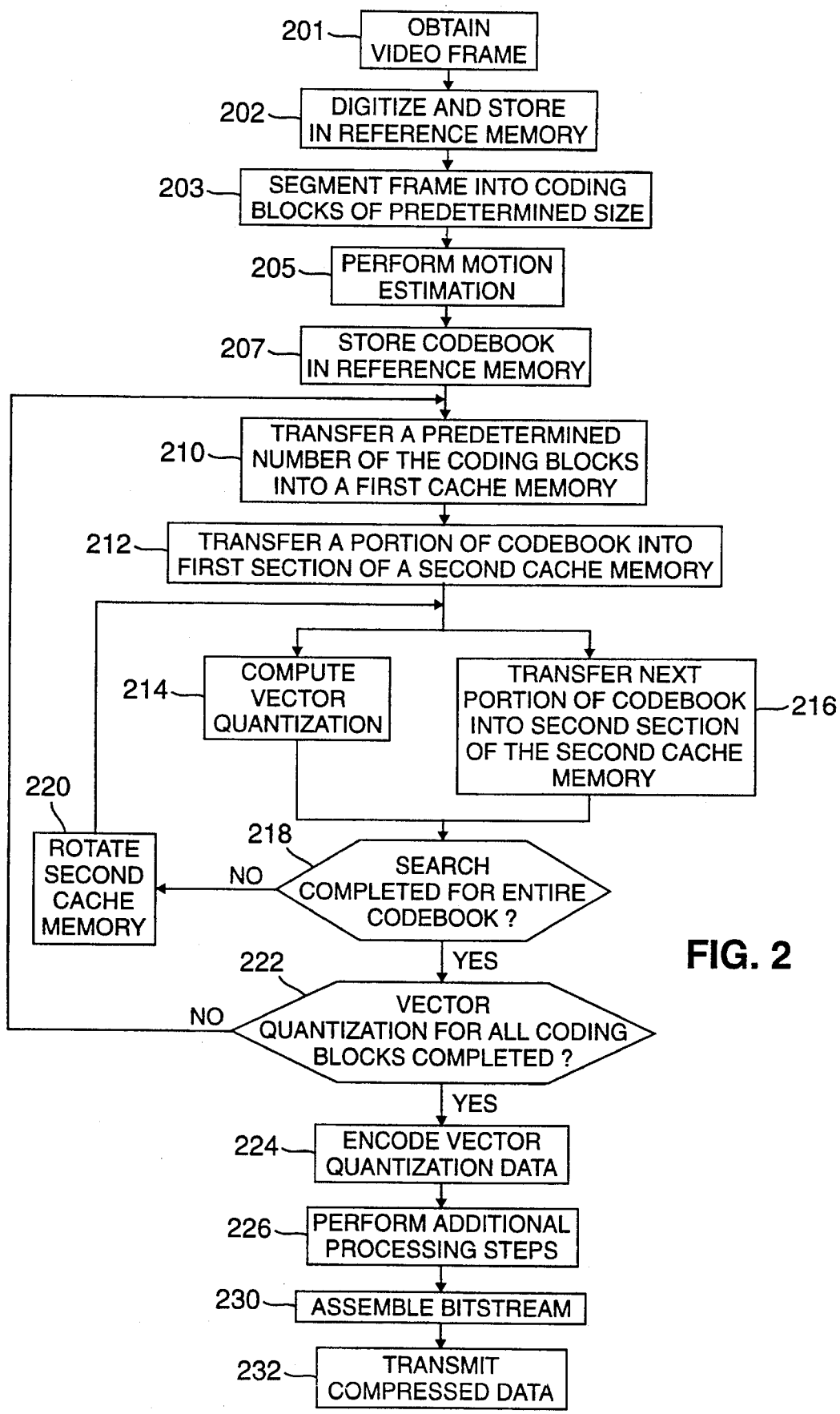
FIG. 2 is a flow chart showing a method according to the principles of the present invention.

FIG. 2 is a flow chart illustrating the steps of implementing vector quantization according to the method of the present invention. As indicated by step 201, a video frame is first obtained by using, for example, the camera 101. The frame may then be digitized by using the A/D converter 103 and stored, for example, in a reference memory such as the DRAM 107 as indicated by step 202. Next, the frame is segmented or divided into a plurality of coding blocks of predetermined size as shown by step 203. For example, a frame that is 112 pixels by 80 pixels may be divided into one hundred and forty coding blocks of 8×8 pixels each such that there are fourteen blocks horizontally and ten blocks vertically. Motion estimation and coding may then be performed for each of the coding blocks as indicated by step 205. During the motion estimation step, a motion vector is calculated for each of the coding blocks in the current frame. A new coding block may be predicted for each coding block in the current frame by using the motion vector calculated for the coding block.

The entire contents of one or more codebooks for use in the vector quantization process may be stored in the reference memory as indicated by step 207. In general, this step need be performed only once for a sequence of frames, although in some applications, the codebook may be updated or adapted after each frame is coded. Next, a predetermined number of the coding blocks are preferably transferred into a first cache memory unit, as shown by step 210 and as further explained below. According to the present invention, a predetermined portion of the codebook or codebooks is transferred into a first section of a second cache memory unit as indicated by step 212. In a preferred embodiment, the predetermined portion of the codebook that is transferred into the second cache memory fills one half of the available memory in the second cache memory.

Once a designated portion of the codebook is transferred into the second cache memory, two steps occur in parallel. First, as indicated by step 214, a vector quantization process is performed with respect to each of the coding blocks that are currently in the first cache memory unit. The vector quantization technique seeks, for example, a best match between each coding block and the entries in the codebook that are currently stored in the first section of the second cache memory.

Figure 3:
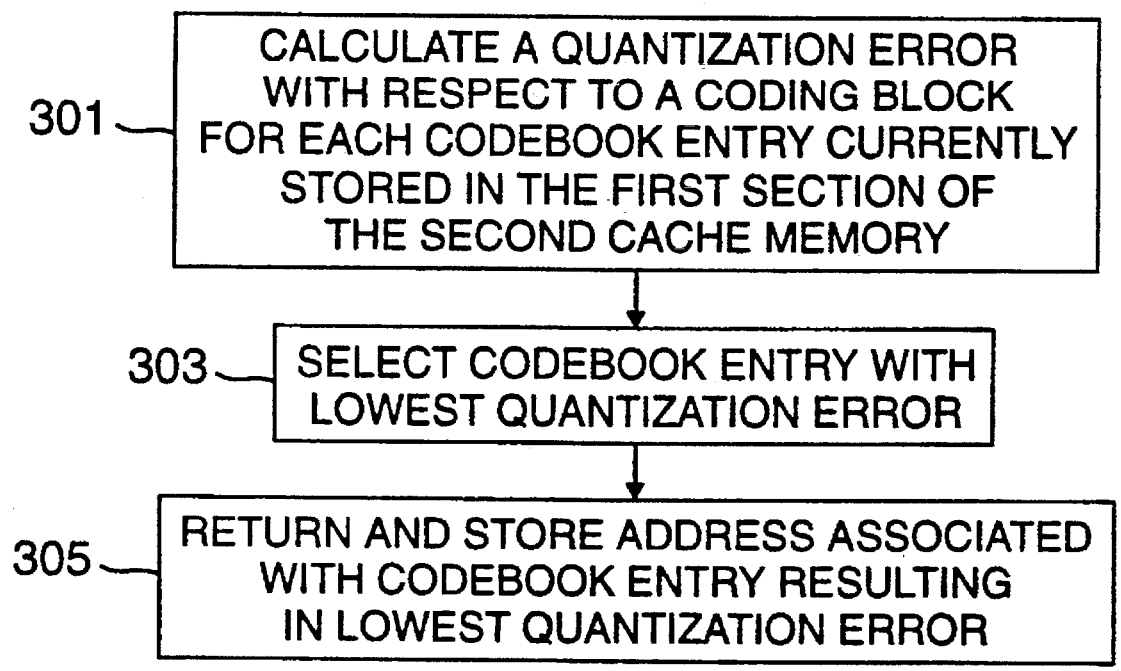
FIG. 3 is a flow chart of an exemplary vector quantization technique for use in the present invention.

FIG. 3 is a flow chart of an exemplary vector quantization technique for use in the present invention. First, as indicated by step 301, a quantization error may be calculated with respect to one of the coding blocks currently stored in the first cache memory for each codebook entry currently stored in the first section of the second cache memory. The best match may then be determined, for example, by selecting the codebook entry which results in the lowest quantization error for a particular coding block, as indicated by step 303. Next, as shown in step 305, an address in the reference memory associated with the codebook entry which is deemed to be the best match from among the entries searched thus far may then be returned and stored in memory, as explained further below.

Referring again to FIG. 2, in parallel or concurrently with the step 214 of performing vector quantization, a next predetermined portion of the codebook is transferred into a second section of the second cache memory, as indicated by step 216. In a currently preferred embodiment, the step of transferring the next predetermined portion of the codebook is initiated after initiating the step of performing the vector quantization process with respect to the portion of the codebook transferred to the first section of the first cache memory. Also, in a preferred embodiment, the next portion of the codebook that is transferred into the second section of the second cache memory fills the remaining half of the available memory in the second cache memory. Furthermore, according to a presently preferred embodiment, the time required to transfer the next portion of the codebook into the second cache memory is equal, or as nearly equal as possible, to the time required to compute the vector quantization for all of the coding blocks currently in the first memory. In any event, the time required to transfer the next portion of the codebook into the second cache memory should be less than or equal to the time required to compute the vector quantization for the blocks currently in the first cache memory. The step 216 of transferring the next portion of the vector quantization codebook is, therefore, preferably completed at the same time or before the step 214 of performing the vector quantization process. This preferred timing may be accomplished by carefully selecting the predetermined number of coding blocks which are transferred to the first cache memory in step 210. Furthermore, any vector quantization technique may be used so long as it employs a predictable search algorithm, such as a linear search. In the context of the present invention, a predictable search algorithm means that the order in which the codebook entries are searched is predetermined such that the next portion of the codebook to be transferred and searched is not a function of the results of previous searches.

As shown by step 218, it is determined whether the search for a best match for each of the coding blocks currently stored in the first cache memory has been completed for the entire codebook. If the search for a best match has not been completed for the entire codebook, then, as indicated by step 220, the addresses associated with the second cache memory are translated, transposed or rotated such that the addresses previously associated with the second section of the second cache memory are now associated with the first section of the second cache memory. In the present application, the term "rotate" or "rotated" will be used to encompass any such rotation, translation or transposition, such as that achieved by using, for example, indirect addressing. If the portions of the codebook previously transferred to the second cache memory each fill one half of the second cache memory, then after the addresses associated with the second cache memory are rotated, the addresses previously associated with the first section of the second cache memory are now associated with the second section of the second cache memory.

The steps 214, 216 of computing the vector quantization and transferring the next portion of the codebook into the second section of the cache memory may be repeated until the entire codebook or codebooks have been searched for a best match for each of the coding blocks currently stored in the first cache memory. After each iteration of the steps 214, 216, the addresses of the second cache memory are rotated according to step 220 if the entire codebook has not been searched for a best match for each of the coding blocks currently stored in the first cache memory. As each subsequent portion of the codebook is searched for a best match for each of the respective coding blocks currently stored in the first cache memory, only the addresses of the reference memory that are associated with the codebook entries which thus far are deemed to be the best matches for each of the respective coding blocks need to be returned and stored.

Once the entire codebook has been searched, and a best match has been determined for each of the respective coding blocks currently stored in the first cache memory, the steps 210–220 may be repeated with respect to the remaining coding blocks in the video frame until all the coding blocks in the frame have been vector quantized, as indicated by step 222. It should be noted that certain applications may involve searching more than one codebook, such as an inter-frame codebook and an intra-frame codebook, for example. In such a situation, the step 214 of computing the vector quantization by performing the steps 301–305, for example, may be performed repeatedly with respect to each of the codebooks.

Once the codebook or codebooks have been searched and a best match selected for all of the coding blocks in the current frame, additional processing of the video frame may take place. For example, the vector quantization data may be encoded, as indicated by step 224. Other video compression processing steps, such as dynamic bit allocation and adaptation or updating of the codebook, may also be performed, as indicated by step 226. As shown by step 230, a bitstream of the compressed video frame data may then be assembled. Finally, as indicated by step 232, the compressed data may be transmitted, for example, to the video decoder 113 where the frame may be reconstructed.

Figure 4:
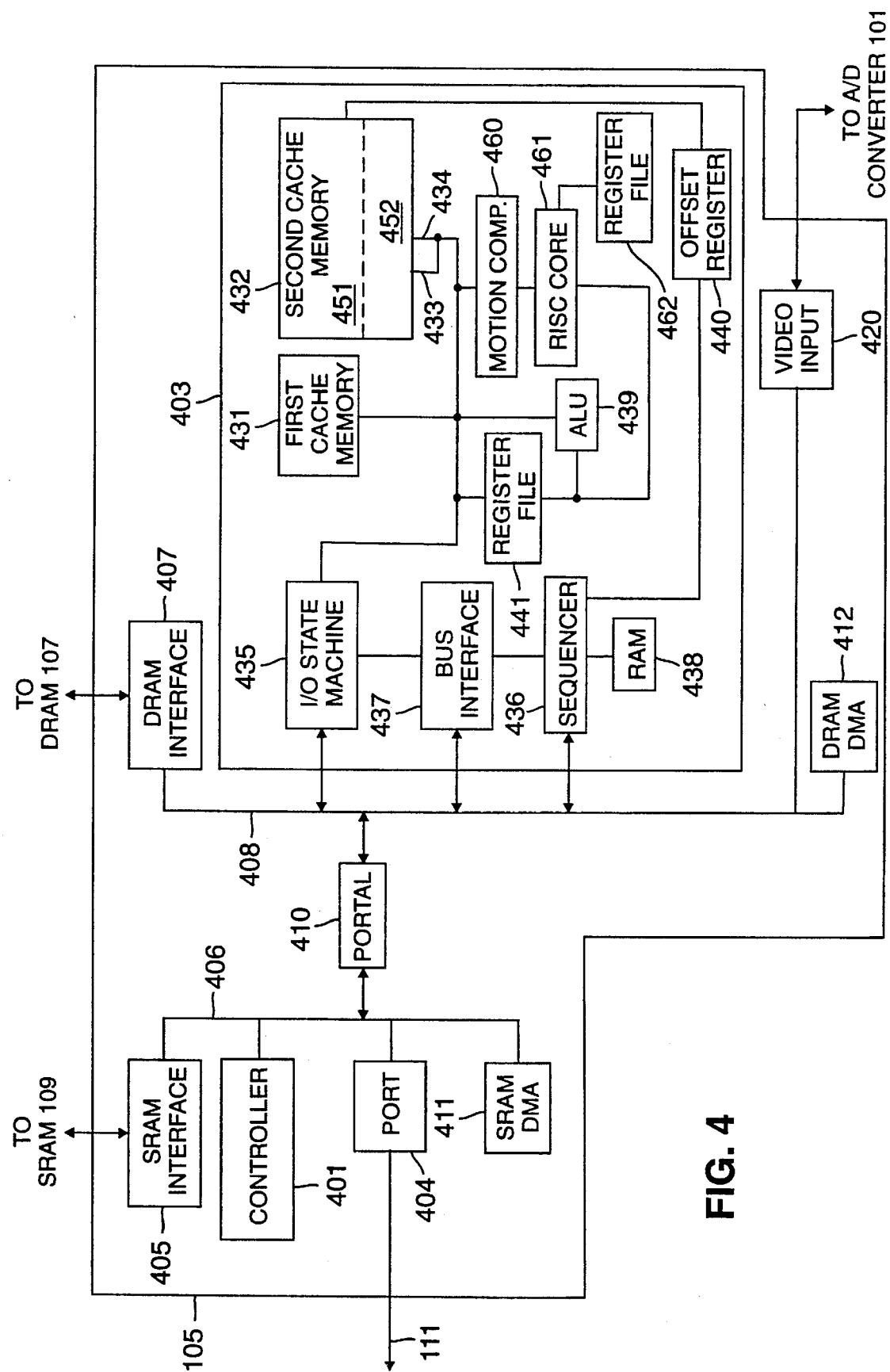
FIG. 4 is a block diagram illustrating an exemplary video compression processor for use in the present invention.

FIG. 4 is a block diagram illustrating an exemplary architecture for implementing the method described above. The video compression processor 105 may suitably be implemented by using, for example, the processor described in U.S. Pat. No. 5,379,351, entitled "Video Compression/Decompression Processing and Processors," which is incorporated by reference herein in its entirety. Specifically, the video compression processor 105 is preferably implemented by using a VCP chip commercially available from Integrated Information Technology, Inc. (IIT).

The video compression processor 105 may suitably have a controller 401, such as a reduced instruction set microprocessor, which, among other things, controls the transfer of data between other units in the video compression processor 105. The controller 401 may be connected to an SRAM bus 406 which also may suitably be connected to an SRAM interface 405, an SRAM direct access memory (DMA) controller 411, and a port 404. The SRAM interface 405 controls access to the SRAM 109 which may be used for program, stack and data storage for the processor 401. The SRAM DMA 411 may have multiple channels and moves data, for example, between the SRAM 109 and a portal 410 or the port 404. The port 404 may be used to transfer a bitstream in or out of the video compression processor 105.

The portal 410 may suitably connect the SRAM bus 406 to a DRAM bus 408 to permit data or control signals to be sent between functional units on different buses. The DRAM bus 408 may be suitably connected to a DRAM interface 407, a DRAM DMA controller 412, a video input unit 420, and a processor 403, further details of which are explained below. The DRAM interface 407 controls access to the DRAM 107, which typically may include, for example, 512 Kilobytes to 8 Megabytes. The DRAM DMA 412 may have multiple channels and moves data between the DRAM 107 and the portal 410, the processor 403 and the video input unit 420.

The processor 403 suitably may have a sequencer 436 which is a microsequencing unit that can run routines or programs stored in a RAM 438, for example. The processor 403 may also have an I/O state machine 435 which handles DMA transfers into and out of the processor 403. The processor 403 preferably comprises two general purpose two-dimensional memories 431, 432. The first memory 431 may suitably have, for example, 1024 bytes. The second memory 432 may suitably have, for example, 1440 bytes. In any event, the amount of memory in the first and second memories 431, 432, respectively, will typically be several orders of magnitude smaller than the amount of memory in the DRAM 107.

The second memory 432 comprises at least two ports 433, 434, to permit simultaneous reading and writing of data to and from the memory 432, respectively. Furthermore, the second memory 432 has a feature which allows the addresses associated with second memory to be rotated with respect to their previous positions. For example, the (0, 0) address of the second memory 432 can be changed to any other location in the memory 432 so that all the addresses will be treated as offset from this new origin. The DM or DPCM memory unit in the IIT VCP chip, further described in U.S. Pat. No. 5,379,351 referred to above, is particularly suited for use as the second memory 432. An offset register 440, for example, may be connected to the sequencer 437 and the second cache memory 432. When a particular function is to be performed with respect to bytes associated with specified addresses in the cache memory 432, the specified addresses are offset according to the information stored in the offset register 440, and the addresses are taken modulo the horizontal and vertical dimensions of the cache memory 432. A wrap-around effect is thereby achieved, so that addresses which fall off the edge of the memory wrap around to the beginning.

The processor 403 further may comprise a register file 441 which can exchange data with the memories 431, 432. The register file may comprise, for example, sixty-four registers each of which holds eight bytes. The register file may be connected to a general purpose arithmetic logic unit (ALU) 439 or other suitable processor for performing such functions as calculating mean absolute differences, and subtracting, adding and comparing values. In the IIT VCP chip, a motion compensation unit 460 connected to the memories 431, 432, and a RISC core 461 may be used to perform these functions. The RISC core 461 is a simple 16-bit computer with associated register files 462.

The architecture described above when suitably programmed is particularly suited for implementing the steps 201–232 of FIG. 2, and, in particular, for implementing the steps 210–222 in real time. As explained above, an input video frame may be received by the camera 101 and digitized by the A/D converter 103. The digitized frame may be captured by the video input unit 420 and stored in the DRAM 107. As further explained above, the frame may be divided into N coding blocks of predetermined size. The entire contents of a 256-entry codebook, for example, to be used with respect to vector quantization steps, also may be stored in the DRAM 107.

When the processor 105 is ready to perform vector quantization, the controller 401, for example, instructs the DRAM DMA 412 to transfer a predetermined number of the coding blocks, Δ, from the DRAM 107 to the first cache memory 431 via the DRAM interface 407, the DRAM bus 408, and the I/O state machine 435. The controller 401 preferably monitors the status of the DRAM DMA 412 so as to know when a requested transfer of data has been completed. The controller 401 also instructs the DRAM DMA 412 to transfer a predetermined portion of the codebook from the DRAM 107 to a first section 451 of the second cache memory 432 using the write port 434. The specified codebook data then is transferred from the DRAM 107 to the cache memory 432 via the DRAM interface 407, the DRAM bus 408 and the I/O state machine 435. As indicated above, in a presently preferred embodiment, each section of the codebook that is written to the second cache memory 432, fills one half of the cache memory 432.

The controller 401 then instructs the sequencer 436 to execute a vector quantization routine, which may be stored in the RAM 438, for each of the Δ coding blocks stored in the first cache memory 431. If the vector quantization technique of FIG. 3 is used, the steps 301, 303 may be performed by the ALU 439. If the IIT VCP chip is used, these functions may be performed by the motion compensation unit 460 and the RISC core 461, respectively. The contents of the first section of the cache memory 432 may be read using the read port 433. The vector quantization addresses associated with the codebook entries resulting in the lowest quantization error for each of the Δ coding blocks may be returned and transferred to the register file 441 where they may be stored for subsequent use.

In parallel or concurrently with execution of the vector quantization routine, the controller 401 instructs the DRAM DMA 412 to transfer a next predetermined portion of the codebook from the DRAM 107 to a second section 452 of the second cache memory 432 using the write port 434. Again, the next portion of the codebook preferably will fill one half of the cache memory 432.

Once the vector quantization routine has been completed with respect to the Δ coding blocks stored in the cache memory 431, and once the next portion of the codebook has been transferred to the second portion of the cache memory 432, the controller 401 sends a control signal to the processor 403 instructing it to rotate the memory 432. The sequencer 436 preferably controls the contents of the offset register 440 so as to rotate the cache memory 432 such that the addresses previously associated with the second section of the cache memory 432 are now associated with the first section of the second cache memory. The steps of computing the vector quantization, transferring a next portion of the codebook into the second section of the cache memory 432, and rotating the second cache memory are reiterated in the manner described above until the entire codebook has been searched for a best match for each of the coding blocks stored in the cache memory 431. The process may then be repeated for subsequent groups of coding blocks that make up the current video frame.

When vector quantization has been performed with respect to the coding blocks in the current frame, the vector quantization information may be transferred to the SRAM 109 and coded. The controller 401 then assembles a bitstream for the compressed data, which may be transferred to the data line 111 via the port 404, for example.

In accordance with the present invention, the controller 401 may be programmed to perform the following functions in the manner described above: instruct the DMA 412 to transfer coding block and codebook data in and out of the DRAM to the first and second cache memories 431–432, respectively; instruct routines, including the vector quantization routine, to be called and executed by the sequencer 436; monitor the status of the processor 403 to know when data transfers have been completed and when called routines have been completed; and instruct the second cache memory 432 to be rotated, as explained above.

One advantage of rotating the cache memory 432, for example, by indirect addressing using the offset register 440, is that, during subsequent iterations of the vector quantization routine, codebook data may be retrieved from the cache memory 432 by using the same set of memory addresses as was used during the first iteration.

Another advantage of the method and apparatus described above is that by balancing the time required to transfer the next portion of the codebook to the cache memory 432 with the time required to compute the vector quantization, the amount of time that the processor 403 is transferring data, but not computing, may be minimized. The present invention thus permits the computation of the vector quantization with respect to one portion of the codebook to commence as soon as the computation with respect to the previous portion is complete, with minimal or no delay. Since little or no time is lost or wasted while transferring data, the present invention allows vector quantization to be performed as least as fast or faster than in typical existing implementations. Thus, even where relatively small memory units, such as the memory units 431, 432, are used, the size of the memory need not be a constraint to real time implementations of video compression techniques that employ vector quantization.

As a standard for comparison, the theoretical optimal time required to search every entry of the codebook or codebooks for every coding block of the current frame may be written as $T_{OPT}=NA\alpha$, where N is the total number of coding blocks in the frame, A is the number of portions of the codebook, and $\alpha$ is the time for the processor 403 to search one portion of the codebook for one coding block. As indicated above, each portion of the codebook preferably will fill one half of the second cache memory. If the number of coding blocks Δ transferred to the cache memory 431 in each iteration of step 210 is greater than $\beta/\theta\alpha$, where $\beta$ is the time required to effect a transfer of one portion of the codebook of predetermined size, and $\theta$ is the fraction of searching time $\alpha$ available for the I/O state machine to function, then the time required to perform the vector quantization can be brought close to $T_{OPT}$. In particular, if $A\alpha \gg \delta$, where $\delta$ is the time required to transfer a single coding block to the cache memory 431, then the actual implementation time will approach $T_{OPT}$, assuming that the time required to transfer a single coding block of 8×8 pixels is much less than the time required to search the entire codebook.

Using the IIT VCP chip, for example, fourteen is the currently preferred number of coding blocks Δ, for a frame having a total of 140 coding blocks and for a codebook with 256 entries, where eight entries are transferred to the cache memory 432 during each iteration of the steps 212 or 216. There is, however, insufficient memory in the register files associated with the RISC core of the IIT VCP chip to store the quantization errors and the addresses for the best matches for all fourteen coding blocks. Nevertheless, the RISC core register files may be used as a cache for the quantization error and the address of the best match for the current coding block. The actual data may be stored in the datapath register file of the IIT VCP chip and transferred to the RISC core register file when needed. In addition, the technique of loop unrolling may be used as a means of reducing overhead computation.

Although the present invention has been described with respect to specific embodiments, it will be appreciated that other arrangements within the spirit and scope of the present invention will be readily apparent to persons of ordinary skill in the art. The present invention is, therefore, limited only by the appended claims.

We claim:

1. A method of vector quantizing a video frame using a vector quantization codebook, wherein the video frame is segmented into a plurality of coding blocks, the method comprising the steps of:

transferring a predetermined portion of the vector quantization codebook into a first section of a first cache memory;

performing a vector quantization process for a predetermined number of the plurality of coding blocks with respect to the portion of the vector quantization codebook transferred to the first section of the first cache memory; and transferring a next predetermined portion of the codebook into a second section of the first cache memory after initiating the step of performing a vector quantization process.

2. The method of claim 1 wherein the step of transferring a next predetermined portion of the vector quantization codebook comprises the step of completing transfer of the next predetermined portion of the vector quantization codebook at the same time as or prior to completion of the step of performing a vector quantization process.

3. The method of claim 1 further comprising the step of selecting the predetermined number of the plurality of coding blocks such that the step of transferring a next predetermined portion of the vector quantization codebook is completed at the same time as or prior to completion of the step of performing a vector quantization process.

4. The method of claim 1 further comprising the step of selecting the predetermined number of the plurality of coding blocks such that the time required to perform the step of performing a vector quantization process is equal to the time required to perform the step of transferring a next predetermined portion of the vector quantization codebook.

5. The method of claim 1 further comprising the step of performing at least the steps of performing a vector quantization process and transferring a next predetermined portion of the vector quantization codebook using an Integrated Information Technology, Inc., VCP chip.

6. The method of claim 5 wherein the step of transferring a predetermined portion of the vector quantization codebook into a first section of a first cache memory comprises the step of transferring the predetermined portion of the vector quantization codebook into the DM memory unit of the Integrated Information Technology, Inc., VCP chip.

7. The method of claim 1 wherein the step of performing a vector quantization process comprises the step of performing a vector quantization process using a predictable search algorithm.

8. The method of claim 1 further including the step of transferring the predetermined number of the plurality of coding blocks into a second cache memory prior to performing the step of performing a vector quantization process.

9. The method of claim 1 further comprising the step of repeating the steps of performing a vector quantization process and transferring a next predetermined portion of the vector quantization codebook until the vector quantization process has been performed with respect to the entire vector quantization codebook.

10. The method of claim 1 wherein the step of transferring a predetermined portion of the vector quantization codebook into a first section of a first cache memory includes the step of transferring a portion of the codebook sufficient to fill one half of the first cache memory.

11. The method of claim 10 wherein the step of transferring a next predetermined portion of the vector quantization codebook into a second section of the first cache memory includes the step of transferring a portion of the codebook sufficient to fill the remaining half of the first cache memory.

12. The method of claim 7 wherein the step of performing a vector quantization process comprises the steps of:

calculating quantization errors;

selecting a codebook entry corresponding to a lowest calculated quantization error; and storing an address associated with the codebook entry corresponding to the lowest quantization error.

13. The method of claim 1 further including the step of rotating the first cache memory such that addresses previously associated with the second section of the first cache memory are associated with the first section of the first cache memory.

14. The method of claim 13 further comprising the step of performing at least the steps of performing a vector quantization process, transferring a next predetermined portion of the vector quantization codebook and rotating the first cache memory, using an Integrated Information Technology, Inc., VCP chip.

15. The method of claim 1 wherein the step of transferring a next predetermined portion of the codebook comprises the step of transferring the next predetermined portion of the codebook into the second section of the first cache memory concurrently with the step of performing the vector quantization process.

16. An apparatus for encoding a video frame comprising:

a reference memory storing a plurality of coding blocks corresponding to a video frame in a sequence of video frames and storing a vector quantization codebook; and a video compression processor comprising:

(a) a first cache memory;

(b) a second cache memory;

(c) a sequencer for executing a vector quantization routine;

(d) means for transferring specified ones of the plurality of coding blocks from the reference memory to the first cache memory;

(e) means for transferring portions of the vector quantization codebook from the reference memory to the second cache memory;

(f) means for instructing a predetermined number of the plurality of coding blocks to be transferred from the reference memory to the first cache memory;

(g) means for instructing a portion of the vector quantization codebook to be transferred from the reference memory to a first section of the first cache memory;

(h) means for instructing the sequencer to perform the vector quantization routine for the predetermined number of the plurality of coding blocks with respect to the portion of the vector quantization codebook currently in the first section of the vector quantization codebook;

(i) means for instructing a next portion of the vector quantization codebook to be transferred to a second section of the second cache memory while the vector quantization routine is being performed; and (j) means for instructing the second cache memory to be rotated such that addresses previously associated with the second section of the second cache memory are associated with the first section of the second cache memory.

17. The apparatus of claim 16 wherein the means for instructing a next portion of the vector quantization codebook to be transferred comprises a controller programmed to direct complete transfer of the next portion of the vector quantization codebook to the second section of the second cache memory prior to completion of the vector quantization routine.

18. The apparatus of claim 17 wherein the video compression processor further comprises an offset register connected between the sequencer and the second cache memory for rotating the second cache memory according to information stored in the offset register.

19. The apparatus of claim 17 wherein the video compression processor comprises an Integrated Information Technology, Inc., VCP chip.

20. The apparatus of claim 17 wherein the video compression processor further comprises an arithmetic logic unit for calculating quantization errors and selecting a codebook entry with a lowest quantization error as part of the vector quantization routine.

21. The apparatus of claim 20 wherein the video compression processor further comprises a register file for storing an address associated with the codebook entry resulting in the lowest quantization error.

22. The apparatus of claim 17 wherein the video compression processor further comprises means for calculating quantization errors, means for selecting a codebook entry with a lowest quantization error, and means for storing an address associated with the codebook entry resulting in the lowest quantization error.

23. The apparatus of claim 17 wherein the second cache memory comprises at least two ports to permit simultaneous reading and writing to and from the second cache memory, respectively.

24. The apparatus of claim 17 wherein the first cache memory and the second cache memory each consist of a number of memory bytes several orders of magnitude smaller than the number of memory bytes in the reference memory.

25. The apparatus of claim 17 wherein the second cache memory consists of 1440 bytes of memory and wherein the first cache memory consists of 1024 memory bytes.

26. The apparatus of claim 16 wherein the means for instructing a predetermined number of the plurality of coding blocks to be transferred memory is programmed to select the predetermined number such that transfer of the next portion of the vector quantization codebook is completed prior to completion of the vector quantization routine.

27. The apparatus of claim 18 wherein the means for instructing the second cache memory to be rotated controls the information stored in the offset register.

28. The apparatus of claim 17 wherein the controller is a reduced instruction set microprocessor.

29. A method of vector quantizing a video frame comprising the steps of:

segmenting the video frame into a plurality of coding blocks;

storing a vector quantization codebook in a reference memory;

transferring a predetermined portion of the vector quantization codebook into a first section of a first cache memory;

performing a vector quantization process for a predetermined number of the plurality of coding blocks with respect to the portion of the vector quantization codebook transferred to the first section of the first cache memory; and transferring a next predetermined portion of the codebook into a second section of the first cache memory after initiating the step of performing a vector quantization process.

* * * * *